United States Patent [19]
Omori et al.

[11] Patent Number: 6,033,126
[45] Date of Patent: Mar. 7, 2000

[54] OPTICAL WAVEGUIDE MODULE HAVING IMPROVED HIGH-FREQUENCY CHARACTERISTICS

[75] Inventors: Yasuhiro Omori; Yoshinobu Kubota, both of Kawasaki; Toshihiro Ohtani; Tomoyuki Itoh, both of Sapporo, all of Japan

[73] Assignee: Fujitsu Limited, Kawasaki, Japan

[21] Appl. No.: 09/021,372

[22] Filed: Feb. 10, 1998

[30] Foreign Application Priority Data

Aug. 28, 1997 [JP] Japan .................................. 9-232280

[51] Int. Cl.[7] ...................................................... G02B 6/36
[52] U.S. Cl. .................................. 385/88; 385/94; 385/9; 385/3
[58] Field of Search ................................. 385/88–94, 3, 385/2, 8, 9, 10

[56] References Cited

U.S. PATENT DOCUMENTS

| 4,692,720 | 9/1987 | Auracher ................................... 333/33 |
| 5,799,116 | 8/1998 | Yamamoto ................................. 385/2 |
| 5,801,871 | 9/1998 | Madabhushi ........................... 385/2 X |

FOREIGN PATENT DOCUMENTS

| 0 287 537 | 10/1988 | European Pat. Off. . |
| 0 773 464 | 5/1997 | European Pat. Off. . |

*Primary Examiner*—Phan T. H. Palmer
*Attorney, Agent, or Firm*—Staas & Halsey LLP

[57] ABSTRACT

An optical waveguide module including a metal package having a bottom surface formed with a chip insertion groove, and a waveguide chip inserted and fixed in the chip insertion groove. The waveguide chip has an optical waveguide formed on a substrate having an electro-optic effect. A signal electrode is formed on the optical waveguide, and a ground electrode is formed on the substrate. The ground electrode is connected to the metal package through first and second ribbons respectively located in the vicinity of first and second bent portions of the signal electrode.

8 Claims, 9 Drawing Sheets

OPTICAL WAVEGUIDE MODULE HAVING IMPROVED HIGH-FREQUENCY CHARACTERISTICS

BACKGROUND OF THE INVENTION

1. Field of the Invention

The present invention relates generally to an optical waveguide module having waveguides and Au electrodes formed on the waveguides, such as an optical modulator module and a polarization scrambler module, and more particularly to an optical waveguide module having good high-frequency characteristics.

2. Description of the Related Art

In recent optical fiber communication systems, a modulation rate has been increased with an increase in transmission rate. In direct intensity modulation of a laser diode, a waveform distortion is caused by wavelength chirping or chromatic chirping. To avoid this problem, an optical modulator module used as an external modulator has increasingly been expected. Further, high-speed optical transmission systems have been put to practical use. In long-haul, large-capacity, high-speed optical transmission systems, a degradation in bit error rate is caused by polarization-dependent gain or loss due to polarization hole burning or the like. As means of solving this problem, a polarization scrambler for varying a polarized condition of transmitted light at high speeds to depolarize the light is effective.

A Mach-Zehnder optical modulator (LN modulator) using a dielectric crystal substrate such as a lithium niobate ($LiNbO_3$) substrate has been developed as a practical external modulator. Carrier light having a fixed intensity from a light source is supplied to the LN modulator to obtain an optical signal intensity-modulated by a switching operation using interference of light. An LN modulator chip is configured by forming a pair of optical waveguides on the surface of a dielectric substrate of Z-cut lithium niobate crystal, forming a buffer layer of $SiO_2$ on the pair of optical waveguides, and forming a signal electrode (traveling wave electrode) and a ground electrode respectively corresponding to the pair of optical waveguides on the buffer layer. The optical waveguides are formed by thermal diffusion of Ti into the substrate to increase a refractive index, thereby being connected together in the vicinity of opposite end portions of the substrate.

Signal light entered the optical waveguides from its one connected end is branched to propagate in the pair of optical waveguides. When a drive voltage is applied to the signal electrode formed on one of the optical waveguides, a phase difference is produced between the branched signal lights by an electro-optic effect. In the LN modulator, these signal lights are combined again to be output as an optical signal. By applying a drive voltage to the signal electrode so that the phase difference between the signal lights propagating in the pair of optical waveguides becomes 0 or $\pi$, for example, a on/off pulse signal can be obtained.

To realize an increased modulation rate in the LN modulator, it is essential to obtain good high-frequency characteristics (attenuation characteristics of microwaves or microwave characteristics of electric reflection). A conventional LN modulator module has a problem such that a modulator chip is not completely grounded to cause a dip of microwave characteristics at a high frequency, resulting in a difficulty of realization of a sufficient wideband performance. This problem arises also in other optical waveguide modules such as a polarization scrambler module and an optical phase modulator module.

SUMMARY OF THE INVENTION

It is therefore an object of the present invention to provide an optical waveguide module which can exhibit good high-frequency characteristics.

In accordance with an aspect of the present invention, there is provided an optical waveguide module comprising a metal package having a bottom surface and a chip insertion groove formed on the bottom surface; a waveguide chip inserted and fixed in the chip insertion groove of the metal package, the waveguide chip including a substrate having an electro-optic effect, an optical waveguide formed on the substrate, a signal electrode formed in relation to the optical waveguide and having first and second bent portions, and a ground electrode formed on the substrate; and first and second ribbons for connecting the ground electrode to the metal package at positions in the vicinity of the first and second bent portions of the signal electrode, respectively.

Preferably, the first and second ribbons are provided in a range of ±0.5 mm along a longitudinal direction of the waveguide chip with respect to the first and second bent portions of the signal electrode, respectively. Further, it is preferable that an upper surface of the waveguide chip inserted and fixed in the chip insertion groove of the metal package is substantially flush with the bottom surface of the metal package.

According to the present invention, the ground electrode of the waveguide chip is connected to the metal package through the first and second ribbons respectively located in the vicinity of the first and second bent portions of the signal electrode. Accordingly, the waveguide chip can be almost completely grounded, thereby reducing a dip of microwave characteristics at a high frequency to ensure a wideband performance of the optical waveguide module.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
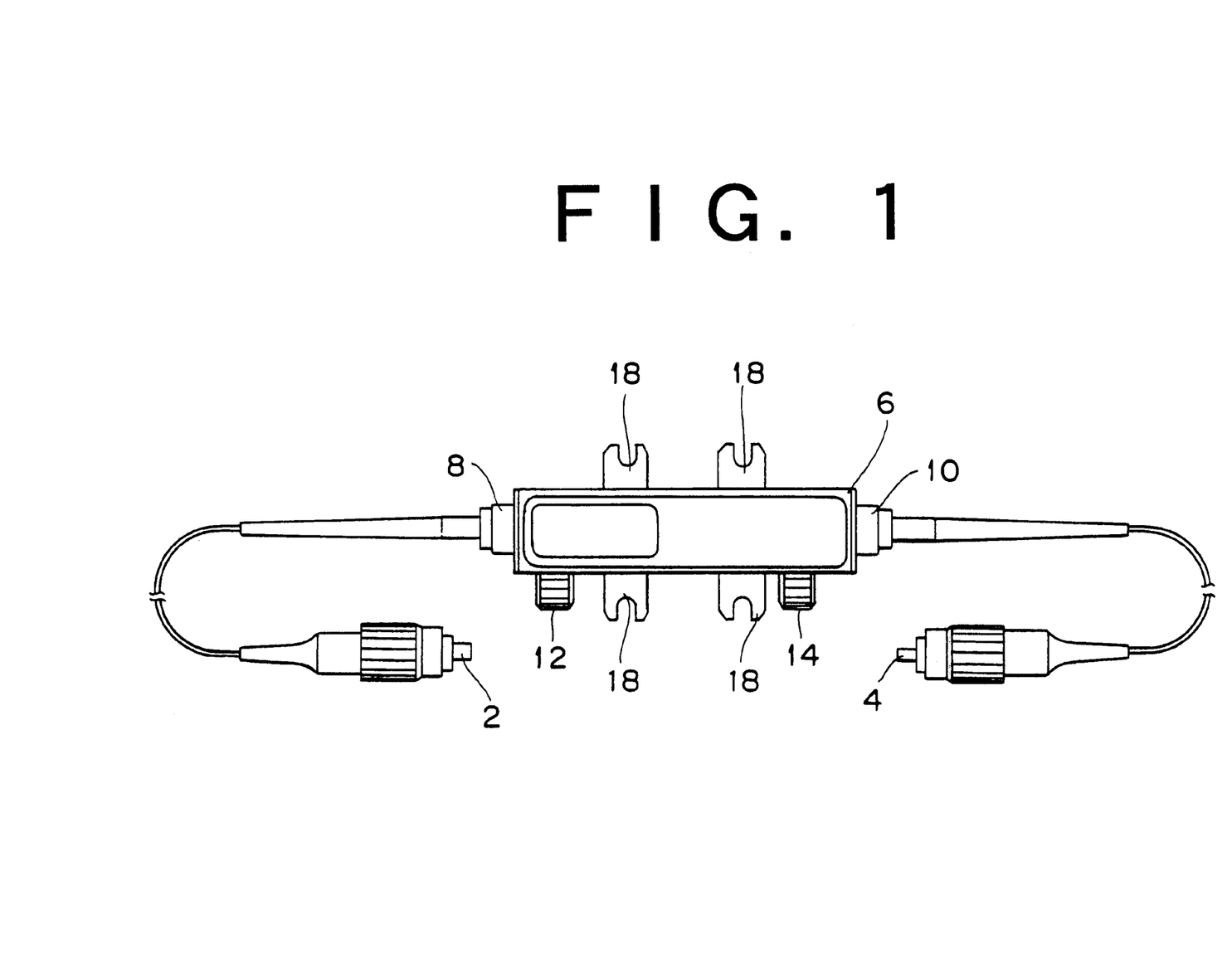
FIG. 1 is a plan view showing the external appearance of a modulator module.

Referring to FIG. 1, there is shown the external appearance of an optical modulator module to which the present invention is applied. This optical modulator module has an input port 2 for receiving signal light to be modulated and an output port 4 for outputting modulated signal light. In this preferred embodiment, the ports 2 and 4 are optical connectors. This optical modulator module has a metal package 6 in which a modulator chip (waveguide chip) to be hereinafter described is incorporated. The metal package 6 is formed of stainless steel, for example. The package 6 is provided at its opposite ends with pigtail type fiber assemblies 8 and 10 for respectively connecting the ports 2 and 4 to the package 6.

Figure 2:
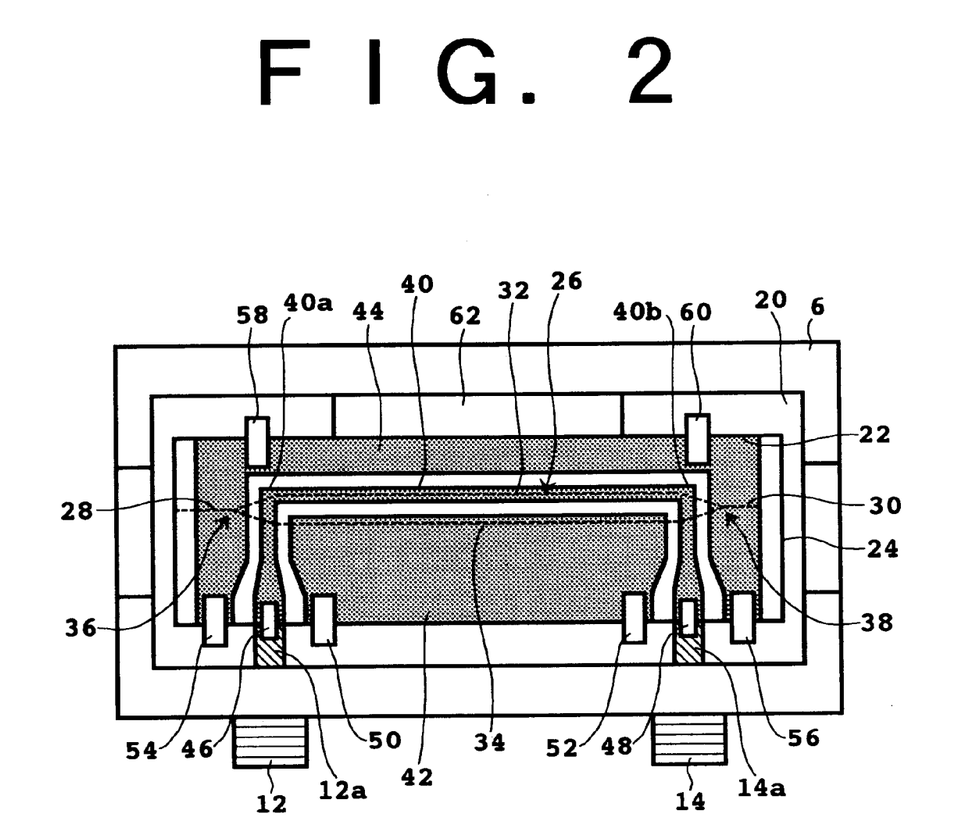
FIG. 2 is a plan view of a preferred embodiment of the present invention.
Figure 3:
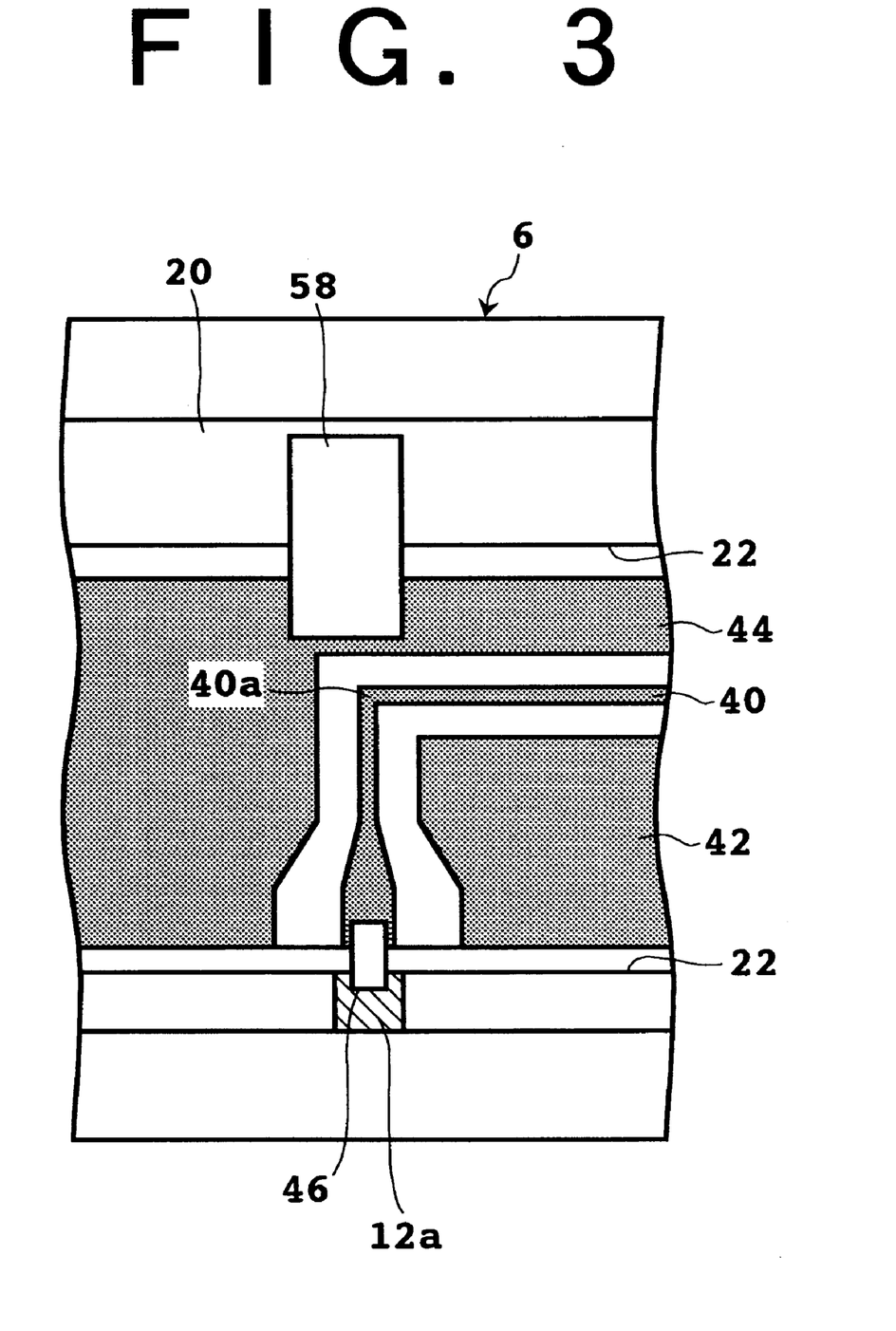
FIG. 3 is an enlarged view of an essential part of the present invention.

Coaxial connectors 12 and 14 for high-speed electrical signals are provided on one of the opposite side surfaces of the package 6. Metal fittings 18 are fixed to the bottom of the package 6 to fix the package 6 to a casing (not shown) or the like. Referring to FIG. 2, there is shown a plan view of an optical modulator module according to a preferred embodiment of the present invention. The optical connectors 2 and 4 and the fiber assemblies 8 and 10 shown in FIG. 1 are not shown in FIG. 2.

Figure 4:
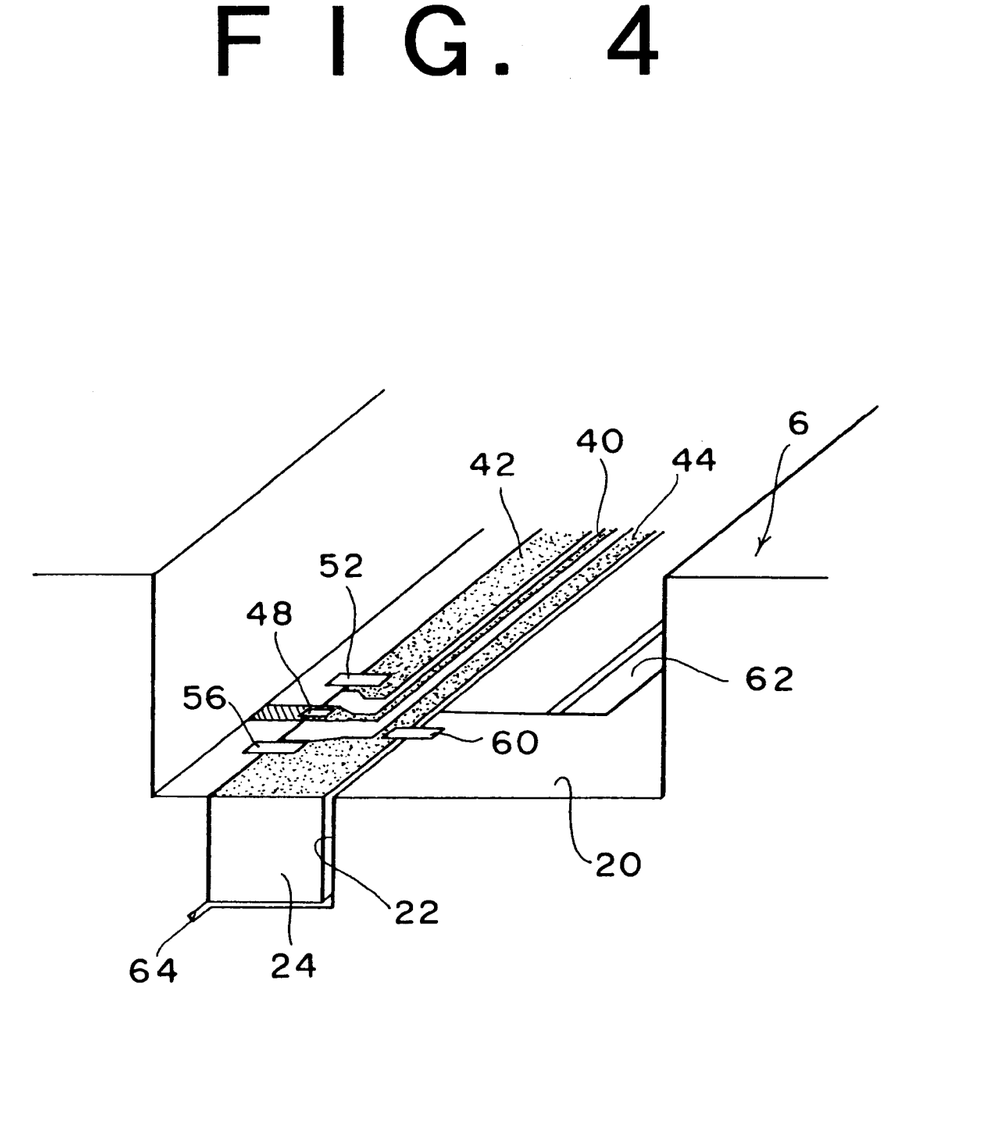
FIG. 4 is a perspective view of an essential part of the present invention.
Figure 5:
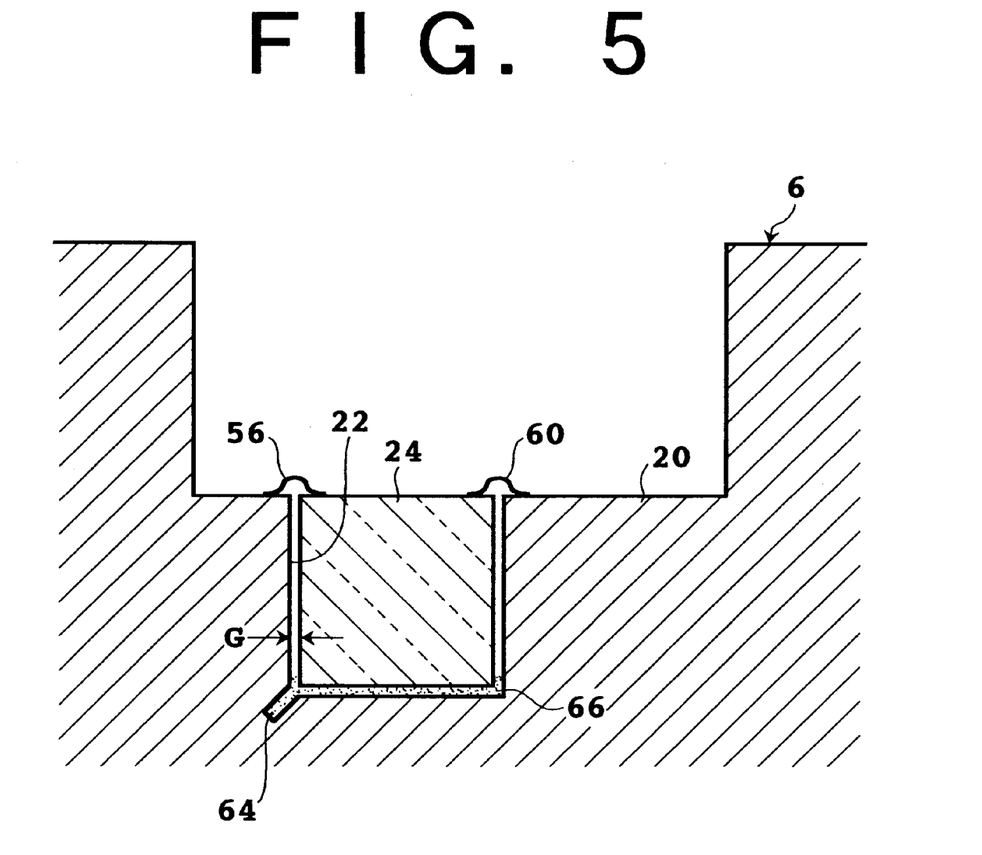
FIG. 5 is a sectional view of the present invention.

As best shown in FIGS. 4 and 5, a chip insertion groove 22 is formed on a bottom surface 20 of the metal package 6 so as to extend in the longitudinal direction of the package 6. A modulator chip 24 is inserted in the chip insertion groove 22 and fixed therein by an adhesive 66 (see FIG. 5). As shown in FIGS. 2 and 4, a recess 62 for allowing an excess adhesive to escape in fixing the modulator chip 24 is formed on the bottom surface 20 of the metal package 6. Further, as shown in FIG. 5, a narrow groove 64 for allowing an excess adhesive to escape is formed along one of the corners of the chip insertion groove 22.

The modulator chip 24 is formed of a dielectric having an electro-optic effect. In this preferred embodiment, the modulator chip 24 is formed of lithium niobate ($LiNbO_3$). The modulator chip 24 has a Mach-Zehnder optical waveguide structure 26 shown by broken lines in FIG. 2. The optical waveguide structure 26 is composed of an input light waveguide 28, an output light waveguide 30, and first and second optical waveguides 32 and 34 extending between the input light waveguide 28 and the output light waveguide 30. The first and second optical waveguides 32 and 34 are connected to the input light waveguide 28 by a Y coupler or Y branch 36, and connected to the output light waveguide 30 by a Y coupler or Y branch 38. The optical waveguide structure 26 is formed by thermal diffusion of titanium (Ti) into a $LiNbO_3$ substrate.

Signal light supplied to the input light waveguide 28 is substantially equally divided in optical power by the Y coupler 36 and guided by the first and second optical waveguides 32 and 34. The branched signal lights guided by the first and second optical waveguides 32 and 34 are coupled into the output light waveguide 30 by the Y coupler 38. A coupled mode where light is guided in the output light waveguide 30 and a radiation mode (leaky mode) where light is radiated from the Y coupler 38 into the modulator chip 24 are switched according to a phase difference between the branched lights guided in the first and second optical waveguides 32 and 34.

To change the phase difference between the branched signal lights, a signal electrode (traveling wave electrode) 40 is provided on the first optical waveguide 32, and a ground electrode 42 is provided on the second optical waveguide 34. Further, another ground electrode 44 is formed on the substrate opposite to the ground electrode 42 with respect to the first optical waveguide 32. The signal electrode 40 has two substantially right-angled bent portions 40a and 40b.

The signal electrode 40 and the ground electrodes 42 and 44 are formed by evaporation of gold (Au) or plating or galvanizing gold, for example. Although not shown, an $SiO_2$ buffer layer is formed below the electrodes 40, 42, and 44.

The signal electrode 40 is connected at one end by bonding through a gold ribbon 46 to a terminal pattern 12a connected to an internal conductor in the coaxial connector 12, and connected at the other end by bonding through a gold ribbon 48 to a terminal pattern 14a connected to an internal conductor in the coaxial connector 14. The ground electrode 42 is connected by bonding through two gold ribbons 50 and 52 to the bottom surface 20 of the metal package 6, and the ground electrode 44 is connected by bonding through four gold ribbons 54, 56, 58, and 60 to the bottom surface 20 of the metal package 6.

Figure 8:
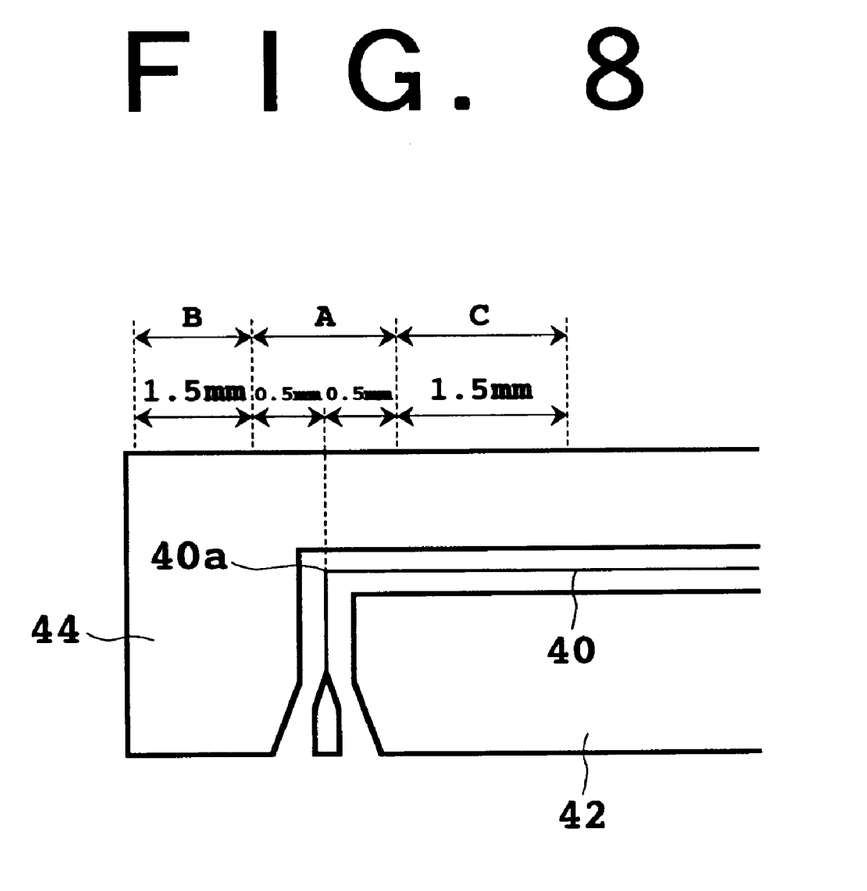
FIG. 8 is a fragmentary plan view showing a bonding portion of a ribbon in the measurement of the characteristics shown in FIGS. 6 and 7.

In the present invention, the positional relation between the bent portions 40a and 40b of the signal electrode 40 and the gold ribbons 58 and 60 is especially important. That is, to realize a high speed of the optical modulator module, it is important to ensure complete grounding of the modulator chip 24. The present inventors have found out that the positional relation between the bent portions 40a and 40b of the signal electrode 40 and the gold ribbons 58 and 60 is important to realize the complete grounding of the modulator chip 24. As the results of various experiments made by the present inventors to reduce a dip of microwave characteristics at a high frequency, it is preferable to bond the gold ribbon 58 in a range of ±0.5 mm (range A) along the longitudinal direction of the modulator chip 24 with respect to the bent portions 40a of the signal electrode 40 as shown in FIG. 8. Similarly, it is preferable to bond the gold ribbon 60 in a range of ±0.5 mm along the longitudinal direction of the modulator chip 24 with respect to the bent portion 40b of the signal electrode 40.

Figure 6:
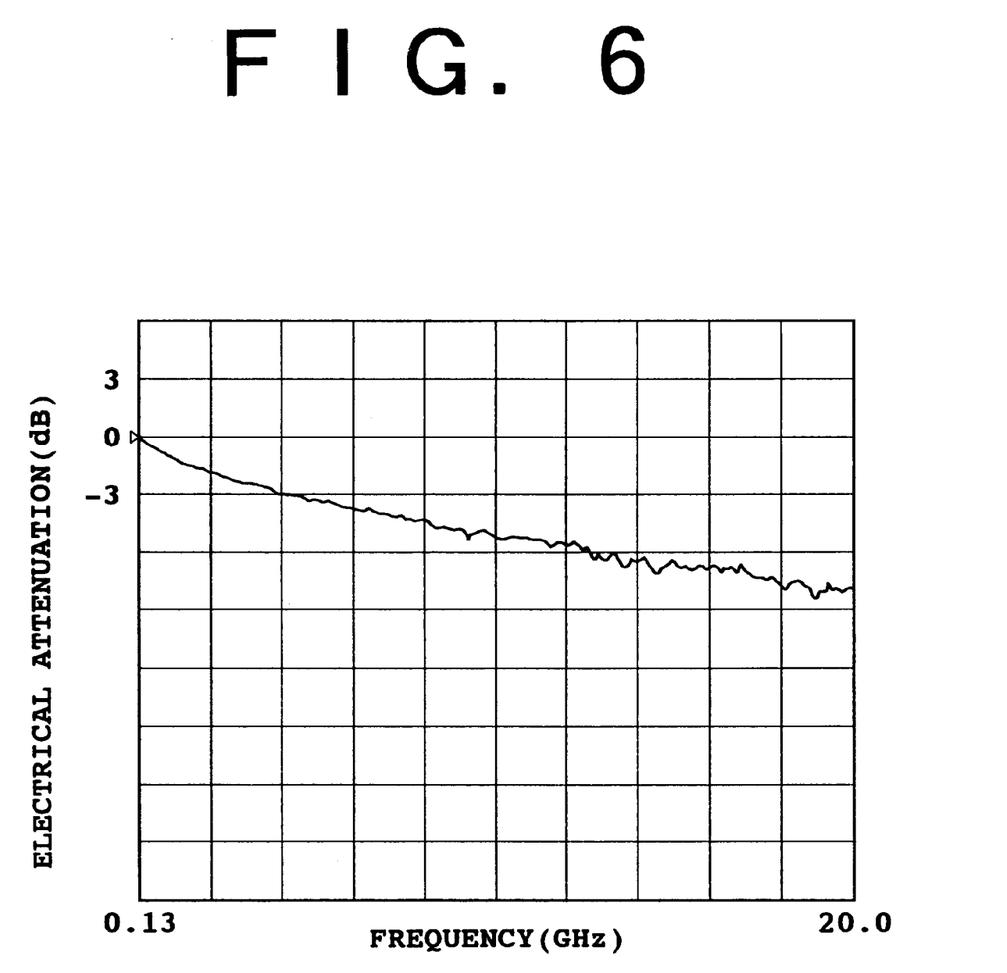
FIG. 6 is a graph showing microwave characteristics in the preferred embodiment.
Figure 7:
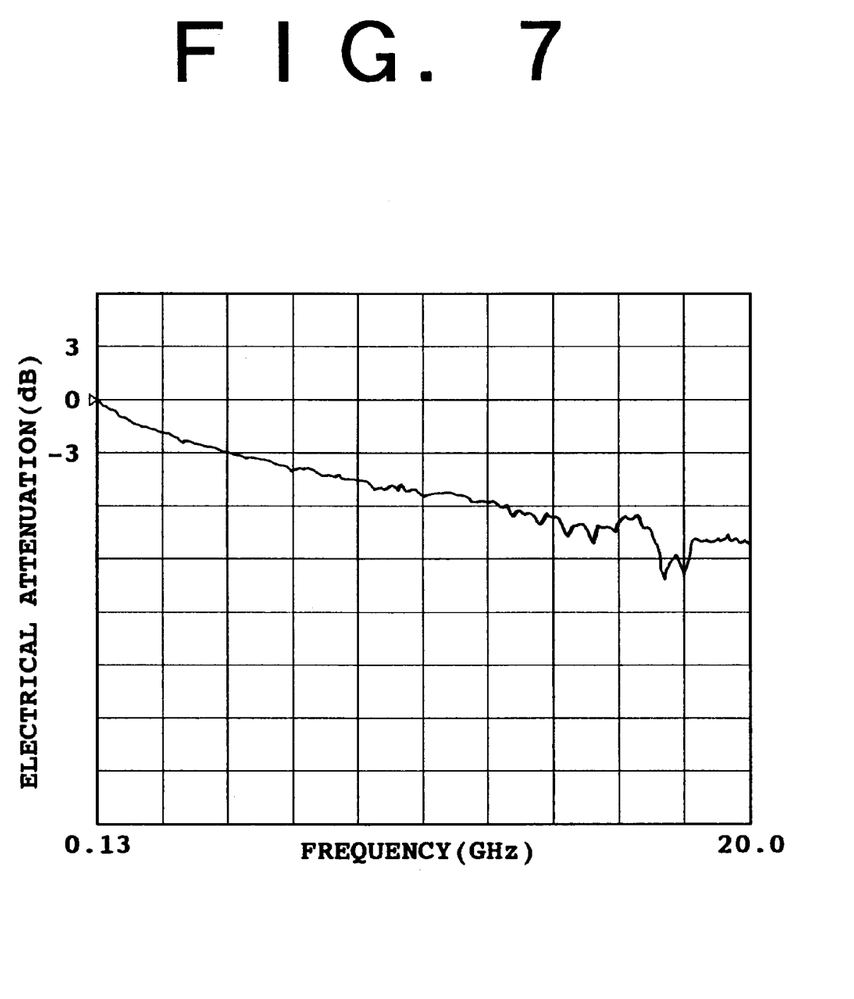
FIG. 7 is a graph showing microwave characteristics of an optical modulator module in the case that a ribbon is bonded at a position spaced a given distance or more from a bent portion of a signal electrode.

FIG. 6 shows microwave characteristics in this preferred embodiment. That is, FIG. 6 shows microwave characteristics of the optical modulator module in the case that the gold ribbon 58 is bonded in the range A shown in FIG. 8. As apparent from FIG. 6, a dip of microwave characteristics at a high frequency is effectively reduced. FIG. 7 shows microwave characteristics of the optical modulator module in the case that the gold ribbon is bonded at a position spaced a given distance or more from the corresponding bent portion of the signal electrode. That is, FIG. 7 shows microwave characteristics in the case that the gold ribbon 58 is bonded in a range B or C shown in FIG. 8. As apparent from FIG. 7, a large dip of microwave characteristics at a high frequency is observed. The comparison between FIG. 6 and FIG. 7 shows that the microwave characteristics at a high frequency in this preferred embodiment is remarkably improved over those shown in FIG. 7.

Each gold ribbon used in this preferred embodiment has a width of 0.4 to 0.5 mm, and the modulator chip 24 has a sectional size of about 1 mm×1 mm and a length of about 4 to 5 cm. To realize sufficient grounding of the modulator chip 24, a gap G between a side surface of the modulator chip 24 and a wall surface of the metal package 6 defining the chip insertion groove 22 must be set to 0.5 mm or less in the condition that the modulator chip 24 is inserted and fixed in the chip insertion groove 22 as shown in FIG. 5. If the gap G is greater than the above value, sufficient grounding of the modulator chip 24 by bonding of the plural gold ribbons becomes difficult.

Figure 9:
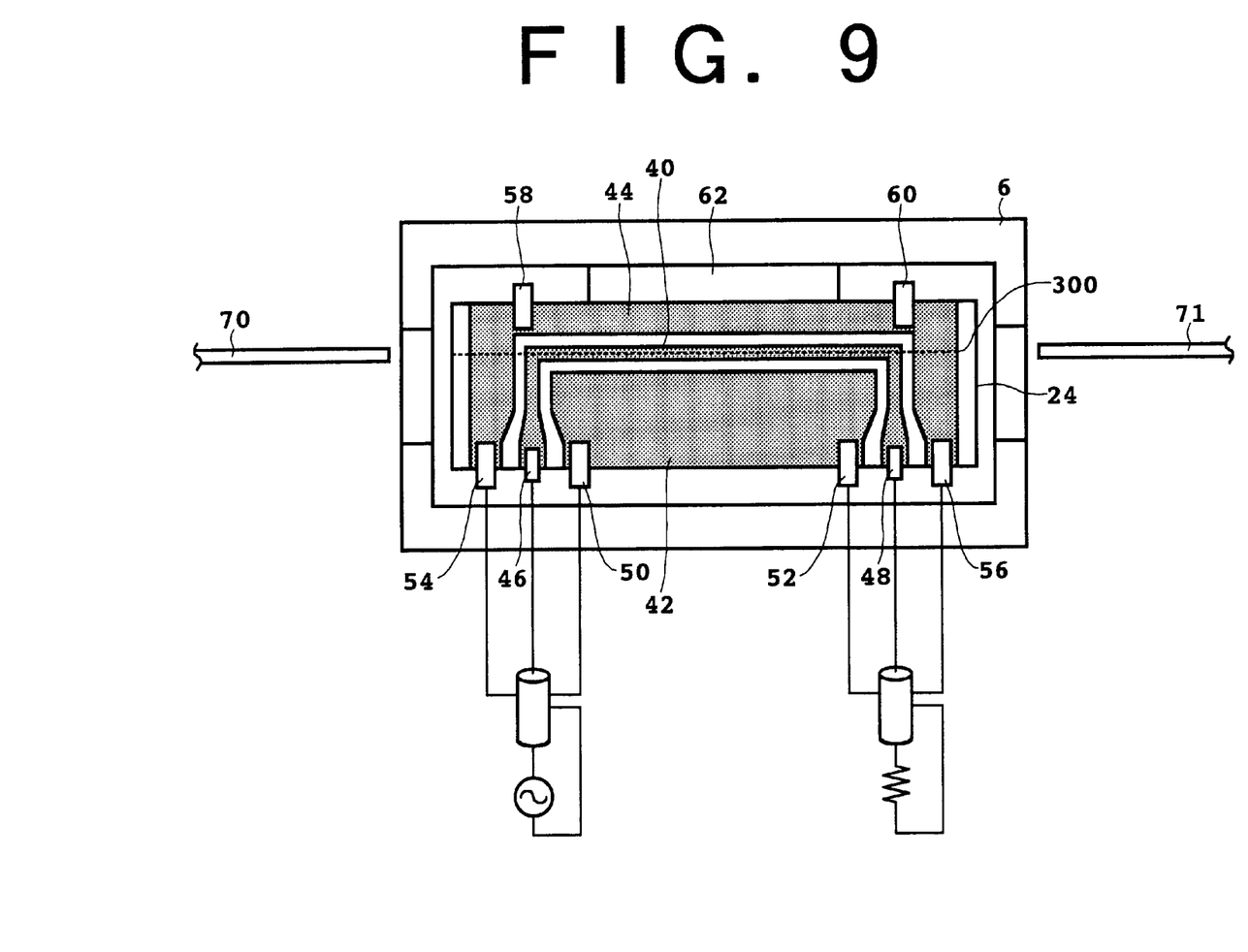
FIG. 9 is a plan view of another preferred embodiment of the present invention.

The problem of occurrence of the dip of microwave characteristics at a high frequency is not limited to the optical modulator module, but this problem occurs also in other optical waveguide modules such as a polarization scrambler module and an optical phase modulator module. FIG. 9 is a schematic plan view of another preferred embodiment of the present invention in the case that the present invention is applied to a polarization scrambler module or an optical phase modulator module. In FIG. 9, substantially the same parts as those of the preferred embodiment shown in FIG. 2 are denoted by the same reference numerals.

In the case that the present invention is applied to an optical phase modulator module, the module has a single straight optical waveguide 300 formed on a dielectric substrate, and a signal electrode 40 formed on or adjacent to the optical waveguide 300. Signal light from an optical fiber 70 enters the optical waveguide 300, and a given drive signal is input to the signal electrode 40, thereby changing the refractive index of the optical waveguide 300 to perform phase modulation of the signal light. The signal light thus phase modulated is coupled into an optical fiber 71.

In the case that the present invention is applied to a polarization scrambler module, the module similarly has a single straight optical waveguide 300 formed on a dielectric substrate, and a signal electrode 40 formed on or adjacent to the optical waveguide 300. In the polarization scrambler module, a polarizer (not shown) is provided on the input side of the optical waveguide 300 so as to be inclined 45° to the optical waveguide 300. Signal light from an optical fiber 70 is passed through the polarizer to enter the optical waveguide 300, and a given drive signal is input to the signal electrode 40, thereby rotating the polarized signal light in the optical waveguide 300 to scramble the polarized signal light. The polarized signal light thus scrambled is coupled into an optical fiber 71.

Also in each of these optical waveguide modules, ribbons 58 and 60 for connecting a ground electrode 44 and a metal package 6 are provided in the vicinity of first and second bent portions of the signal electrode 40, thereby obtaining good characteristics similar to those of the preferred embodiment shown in FIG. 2.

As described above, the ground electrode is connected by bonding to the metal package through the first and second ribbons respectively located in the vicinity of the first and second bent portions of the signal electrode. Accordingly, the dip of microwave characteristics at a high frequency can be effectively reduced to thereby realize a wideband performance of the optical waveguide module.

What is claimed is:

1. An optical waveguide module comprising:
   a metal package having a bottom surface and a chip insertion groove formed on said bottom surface;
   a waveguide chip inserted and fixed in said chip insertion groove of said metal package, said waveguide chip including a substrate having an electro-optic effect, an optical waveguide formed on said substrate, a signal electrode formed in relation to said optical waveguide and having first and second bent portions, and a ground electrode formed on said substrate; and
   first and second ribbons for connecting said ground electrode to said metal package at positions in the vicinity of said first and second bent portions of said signal electrode, respectively.

2. An optical waveguide module according to claim 1, wherein said first and second ribbons are provided in a range of ±0.5 mm along a longitudinal direction of said waveguide chip with respect to said first and second bent portions of said signal electrode, respectively.

3. An optical waveguide module according to claim 1, wherein an upper surface of said waveguide chip inserted and fixed in said chip insertion groove of said metal package is substantially flush with said bottom surface of said metal package.

4. An optical waveguide module according to claim 1, wherein said first and second ribbons are formed of gold.

5. An optical waveguide module according to claim 1, wherein said substrate is formed of $LiNbO_3$, and said optical waveguide is formed by thermal diffusion of Ti into said $LiNbO_3$ substrate.

6. An optical waveguide module according to claim 1, wherein a gap between a side surface of said waveguide chip inserted and fixed in said chip insertion groove and a wall surface of said metal package defining said chip insertion groove is set to 0.5 mm or less.

7. An optical modulator module comprising:
   a metal package having a bottom surface and a chip insertion groove formed on said bottom surface;
   a waveguide chip inserted and fixed in said chip insertion groove of said metal package, said waveguide chip including a substrate having an electro-optic effect; an optical waveguide structure having an input light waveguide, an output light waveguide, and first and second optical waveguides extending between said input light waveguide and said output light waveguide, each of the first and second optical waveguides having an input end and an output end, the input and output ends being respectively connected to said input and output light waveguides; a signal electrode formed on said first optical waveguide and having first and second bent portions; a first ground electrode formed on said second optical waveguide; and a second ground electrode formed on said substrate opposite to said first ground electrode with respect to said signal electrode; and
   first and second ribbons for connecting said second ground electrode to said metal package at positions in the vicinity of said first and second bent portions of said signal electrode, respectively.

8. An optical waveguide module comprising:
   a package;
   a waveguide chip inserted in said package, said waveguide chip including a substrate having an electro-optic effect, an optical waveguide formed on said substrate, a signal electrode formed in relation to said optical waveguide and having first and second bent portions, and a ground electrode formed on said substrate; and
   first and second ribbons for connecting said ground electrode to said package at positions in the vicinity of said first and second bent portions of said signal electrode, respectively.

* * * * *